United States Patent
Feick et al.

(10) Patent No.: US 8,695,478 B2
(45) Date of Patent: Apr. 15, 2014

(54) METHOD OF OPERATING A MOTOR VEHICLE BRAKE SYSTEM

(75) Inventors: Stefan Feick, Kirchheimbolanden (DE); Thorsten Ullrich, Gernsheim (DE); Klaus Dieter Pagel, Darmstadt (DE)

(73) Assignee: Continental Teves AG & Co. oHG (DE)

( * ) Notice: Subject to any disclaimer, the term of this patent is extended or adjusted under 35 U.S.C. 154(b) by 1066 days.

(21) Appl. No.: 12/279,014

(22) PCT Filed: Feb. 14, 2007

(86) PCT No.: PCT/EP2007/051440
§ 371 (c)(1),
(2), (4) Date: Mar. 3, 2009

(87) PCT Pub. No.: WO2007/096284
PCT Pub. Date: Aug. 30, 2007

(65) Prior Publication Data
US 2010/0050857 A1 Mar. 4, 2010

(30) Foreign Application Priority Data

Feb. 23, 2006 (DE) .......................... 10 2006 008 956
Dec. 19, 2006 (DE) .......................... 10 2006 059 949

(51) Int. Cl.
*B60T 13/66* (2006.01)

(52) U.S. Cl.
USPC ........................................................ 91/367

(58) Field of Classification Search
USPC ................................ 91/367; 303/114.1, 114.3
See application file for complete search history.

(56) References Cited

U.S. PATENT DOCUMENTS

| | | | | |
|---|---|---|---|---|
| 5,096,268 A | * | 3/1992 | Schiel et al. ................ | 303/114.1 |
| 5,816,667 A | * | 10/1998 | Jokic .......................... | 303/114.3 |
| 6,367,889 B1 | * | 4/2002 | Tsubouchi et al. ......... | 303/114.3 |
| 6,491,356 B2 | * | 12/2002 | Kanazawa et al. .......... | 303/114.3 |

FOREIGN PATENT DOCUMENTS

| | | | |
|---|---|---|---|
| DE | 10230865 A1 * | 2/2004 | .............. B60T 13/66 |
| DE | 10 2004 011 622 A1 | 3/2005 | |
| DE | 10 2005 025 304 A1 | 12/2006 | |
| DE | 10 2006 036 387 A1 | 2/2007 | |
| WO | WO 2005/032896 A2 | 4/2005 | |
| WO | WO 2006/084864 A1 | 8/2006 | |

* cited by examiner

*Primary Examiner* — F. Daniel Lopez
(74) *Attorney, Agent, or Firm* — RatnerPrestia

(57) ABSTRACT

In order to impart a pleasant brake pedal feeling to the operator in the transition from a 'conventional mode' to a 'brake-by-wire' mode, it is disclosed that the travel (s) covered upon application of the brake pedal is determined and subsequently reduced by the operator, and in that upon reduction of the actuating travel (s) by a predetermined value (Δs) or in the event of a detected vehicle movement or a positive result of a monitoring function of the connecting and disconnecting device running in the background, the connecting and disconnecting device is activated and the brake booster is actuated by the electronic control unit.

8 Claims, 4 Drawing Sheets

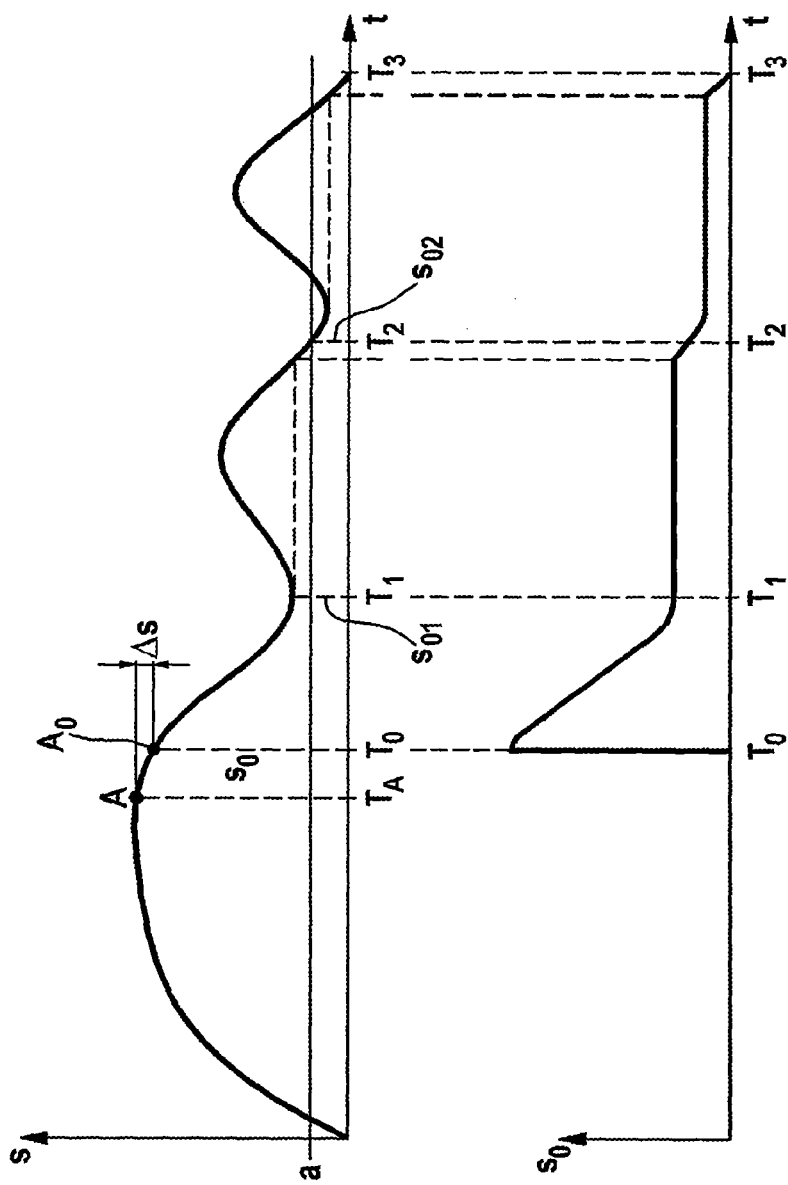

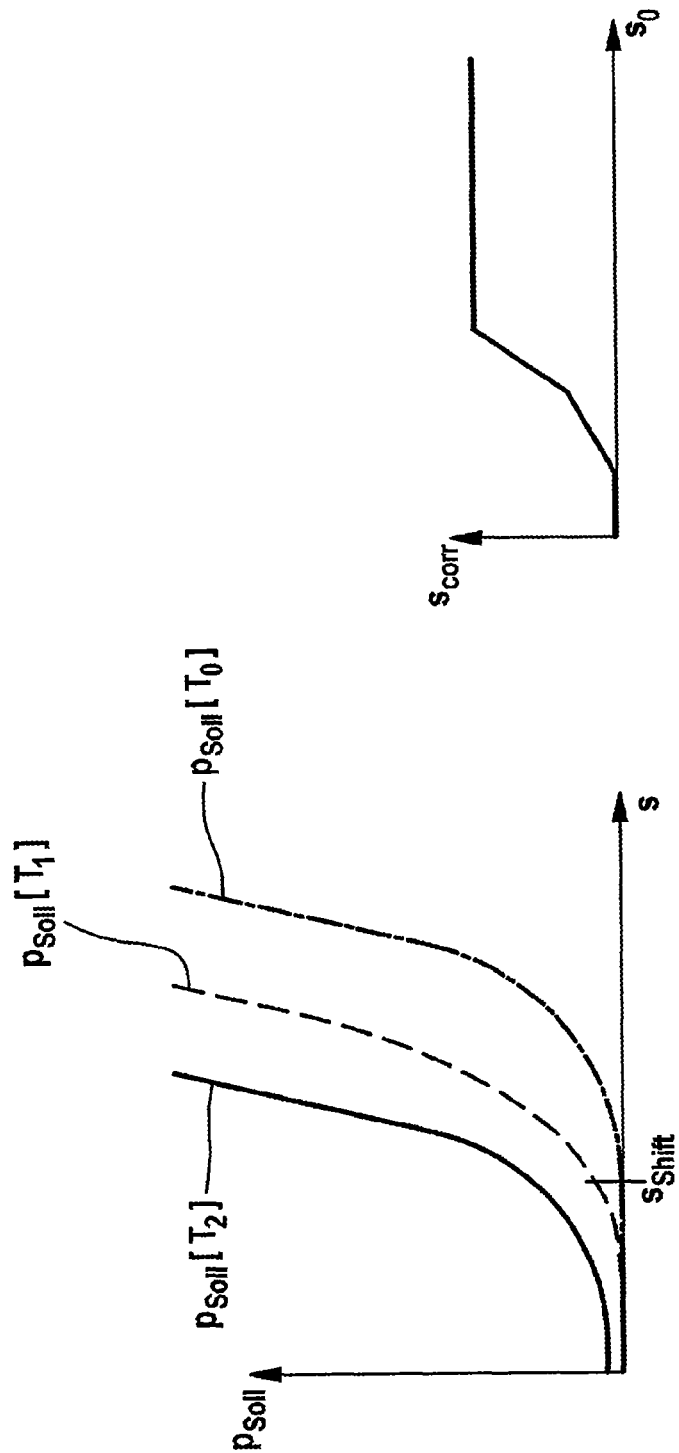

METHOD OF OPERATING A MOTOR VEHICLE BRAKE SYSTEM

CROSS REFERENCE TO RELATED APPLICATIONS

This application is the U.S. national phase application of PCT International Application No. PCT/EP2007/051440, filed Feb. 14, 2007, which claims priority to German Patent Application No. DE102006008956.1, filed Feb. 23, 2006, and German Patent Application No. DE102006059949.7, filed Dec. 19, 2006, the contents of such applications being incorporated by reference herein in their entirety.

FIELD OF THE INVENTION

The present invention relates to a method of operating a motor vehicle brake system of the 'brake-by-wire' type, including
a) a brake booster operable both by means of an input member that is movable into a force-transmitting connection with a brake pedal and by means of an electronic control unit, with a distance being provided between the brake pedal and the brake booster which allows decoupling a force-transmitting connection between the brake pedal and the brake booster in the 'brake-by-wire' operating mode,
b) a master brake cylinder connected downstream of the brake booster,
c) means to detect the actuating travel of the brake pedal,
d) a pedal travel simulator which cooperates with the brake pedal and allows simulating a resetting force that acts on the brake pedal in the 'brake-by-wire' operating mode independently of an actuation of the brake booster, and
e) a connecting and disconnecting device connecting the pedal travel simulator in the 'brake-by-wire' operating mode when the force-transmitting connection between the brake pedal and the brake booster is decoupled and disconnecting it outside the 'brake-by-wire' operating mode.

BACKGROUND OF THE INVENTION

A brake system is disclosed in the applicant's German patent application DE 10 2004 011 622 A1. The above-mentioned connecting and disconnecting device in a design of the prior art brake system is provided by a hydraulic cylinder-and-piston arrangement, the pressure chamber of which is connected to a pressure fluid volume take-up element by means of a closable connection and on the pistons of which a simulator housing is supported. The connection between the pressure chamber and the pressure fluid volume take-up element that is designed as a low-pressure accumulator is closed by means of an electromagnetically operable shut-off valve which is configured as a normally open switch valve. The mentioned piston is moved when the connecting and disconnecting device is tested, and the pressure rising in the hydraulic pressure chamber is measured and the corresponding pressure signal is evaluated. The testing operation can be performed at standstill in a first application of the brake pedal after the ignition has been turned on. This state can be referred to as 'conventional mode'. Upon termination of the testing operation a change is made into the actual 'by-wire mode', and the change-over is executed as soon as a fully released brake pedal is detected. The brake pedal feeling imparted to the vehicle driver in the 'conventional mode' differs greatly from the feeling in the 'by-wire mode'.

In view of the above, an object of the invention is to propose appropriate measures which allow changing over from the 'conventional mode' into the 'by-wire mode' and, thus, adapting the brake pedal feeling to the respective situation.

SUMMARY OF THE INVENTION

According to aspects of the invention, the foregoing object is achieved in that the travel covered upon application of the brake pedal is determined and subsequently reduced by the operator, and in that upon reduction of the actuating travel by a predetermined value or in the event of a detected vehicle movement or a positive result of a monitoring function of the connecting and disconnecting device running in the background, the connecting and disconnecting device is activated and the brake booster is actuated by the electronic control unit.

More specifically, the connecting and disconnecting device is formed of a hydraulic cylinder-and-piston arrangement, whose piston on which a housing of the pedal travel simulator is supported delimits a pressure chamber, which can be connected to a pressure fluid volume take-up element by way of a connection which is closable by means of a shut-off valve, and in that the connecting and disconnecting device is activated by change-over of the shut-off valve into its closed switch position.

In this context, it is especially favorable when the nominal value of the hydraulic pressure that is introduced into the master brake cylinder by actuation of the brake booster is taken from a characteristic curve, which associates a pressure value with an actuating travel of the brake pedal and which, compared to a nominal characteristic curve (along the axis on which the actuating travel values are plotted), is shifted by a value which corresponds to the shortest actuating travel since the activation of the connecting and disconnecting device and the actuation of the brake booster minus a correction value.

These and other aspects of the invention are illustrated in detail by way of the embodiments and are described with respect to the embodiments in the following, making reference to the Figures.

BRIEF DESCRIPTION OF THE DRAWINGS

Aspects of the invention will be explained in detail in the following description making reference to the accompanying drawings. In the drawings:
FIGS. 3a, b show graphs of the time variations of the brake pedal actuating travel;
and
FIG. 4 shows characteristic curves which associate values of the hydraulic pressure introduced into the master brake cylinder to defined brake pedal actuating travels.
FIG. 5 illustrates the dependency of the correction value $s_{corr}$ on value $s_0$.

DETAILED DESCRIPTION OF THE PREFERRED EMBODIMENTS

Figure 1:
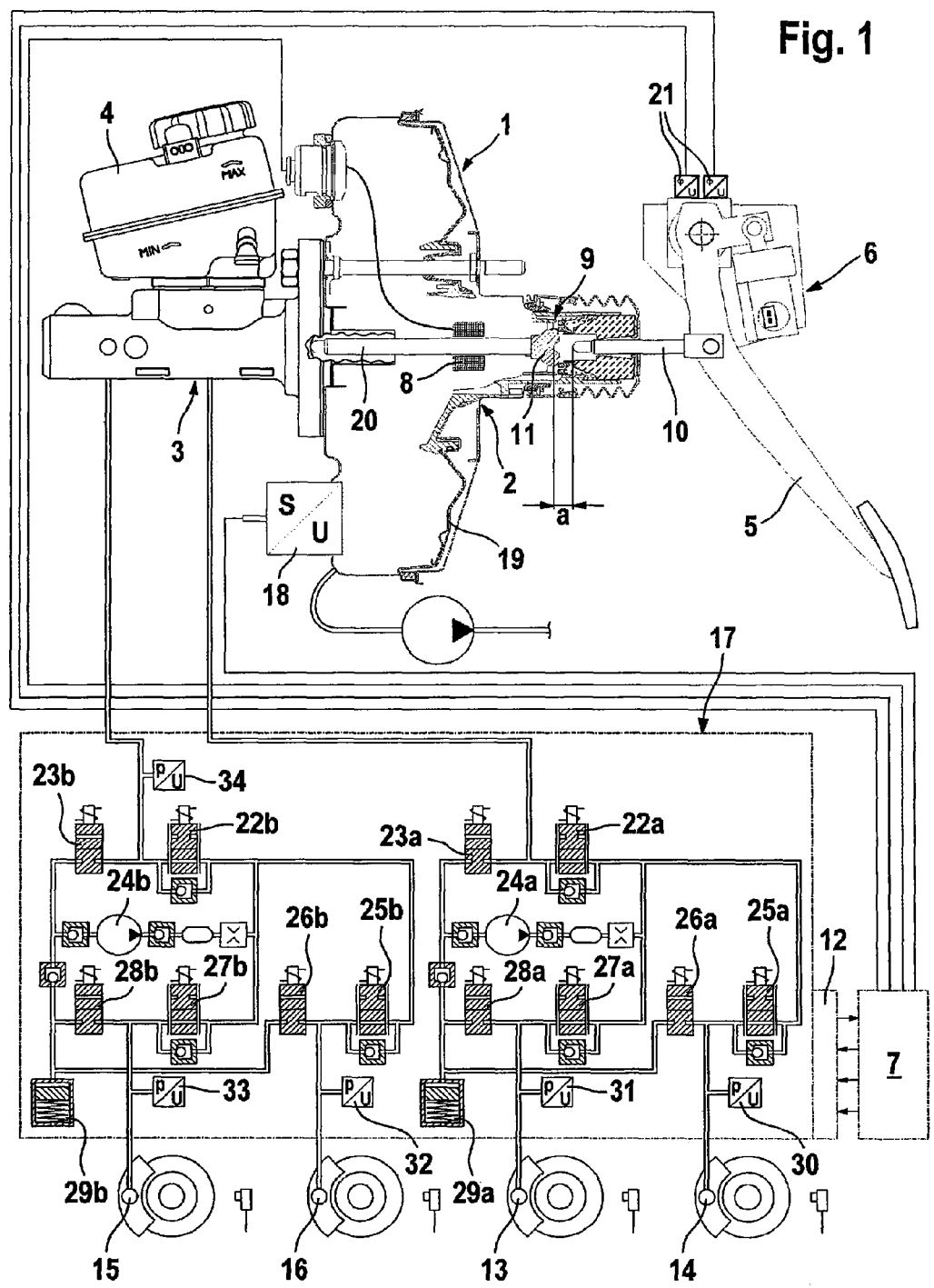
FIG. 1 is a representation of the brake system in which an exemplary method can be implemented, according to one aspect of the invention.

The motor vehicle brake system shown in FIG. 1 of the drawings which preferably can be operated in the 'brake-by-wire' operating mode, essentially consists of an actuating unit 1, a hydraulic control and regulation unit (HCU) 17, vehicle wheel brakes 13, 14, 15, 16 connected to the hydraulic control and regulation unit (HCU) 17, a first electronic control and regulation unit 7 associated with the actuating unit 1 as well as a second electronic control and regulation unit 12 associated with the hydraulic control and regulation unit (HCU) 17. The actuating unit 1, in turn, consists of a brake booster, preferably a vacuum brake booster 2, a master brake cylinder connected downstream of the brake booster 2, preferably a tandem master cylinder 3, to the pressure chambers (not shown) of which the above-mentioned wheel brakes 13, 14, 15, 16 are connected by the intermediary of the hydraulic control and regulation unit 17, and a pressure fluid supply tank 4 associated with the master brake cylinder 3. A brake pedal 5 is used for actuation of the brake booster 2 by the driver, and a pedal travel simulator 6 is provided which cooperates with the brake pedal 5, in particular in the 'brake-by-wire' operating mode, and imparts the customary brake pedal feeling to the driver. A driver's deceleration request or the actuating travel of the brake pedal 5 is detected by means of at least one sensor device 21, the signals of which are sent to the above-mentioned first electronic control unit 7. The output signals of the first electronic control unit 7 enable, among others, actuation of an electromagnet 8 associated with the brake booster 2 which renders it possible to actuate a pneumatic control valve 9 independently of the driver's wish, the said control valve controlling the supply of air to the brake booster 2. As will be explained in detail in the following description, the first electronic control and regulation unit 7 comprises a control circuit for controlling a characteristic quantity of the brake booster 2, preferably the travel covered by the output member 20 of the brake booster 2, and/or a quantity for controlling the hydraulic pressure that prevails in the system.

An axial slot or distance 'a' provided between the end of an input member (piston rod) 10 coupled to the brake pedal 5 and a control piston 11 of the above-mentioned control valve 9 ensures decoupling the force-transmitting connection between the brake pedal 5 and the brake booster 2 in the 'brake-by-wire' operating mode. A travel sensor 18 is used to detect the travel of a movable wall 19 that generates the boosting power of the brake booster 2, or the travel of the above-mentioned output member 20 of the brake booster 2, which transmits its output force onto a non-illustrated first piston of the master brake cylinder 3. In addition, a pressure sensor 34 is integrated in the hydraulic control unit 17 and senses the hydraulic inlet pressure that prevails in the system.

Figure 2:
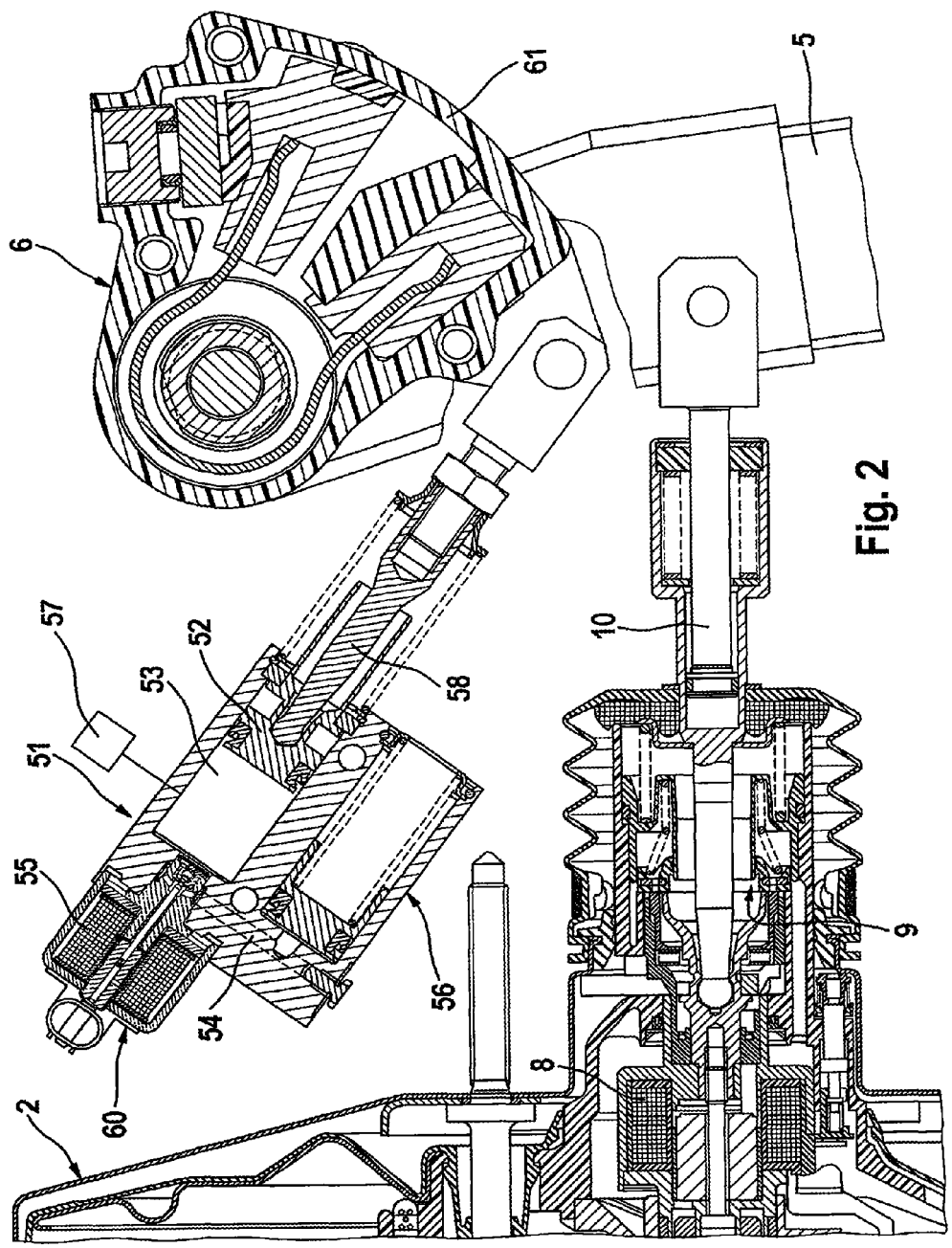
FIG. 2 is a partial cross-sectional view of a design of the brake actuation unit which is used in the brake system according to FIG. 1.

The pedal travel simulator 6 by which, as has been mentioned above, a resetting force acting on the brake pedal 5 in the 'brake-by-wire' operating mode can be simulated irrespective of an actuation of the brake booster 2, is designed in such a fashion that it can be enabled in the 'brake-by-wire' operating mode by means of a connecting and disconnecting device 60 illustrated in an axial cross-section in FIG. 2 when the force-transmitting connection between the brake pedal 5 and the brake booster 2 is decoupled, and can be disabled outside the 'brake-by-wire' operating mode.

Further, it can be taken from the drawing that the hydraulic control and regulation unit (HCU) 17 includes all hydraulic and electrohydraulic components required to perform brake pressure control operations such as ABS, TCS, ESP, etc. Among these are per brake circuit: each one separating valve 22a, b, one electric change-over valve 23a, b, a hydraulic pump 24a, b, in each case two electrically actuatable pressure control valves or inlet and outlet valves 25a, b, 26a, b, 27a, b, and 28a, b for the selective adjustment of the brake pressure at the wheel brakes 13 to 16, each one low-pressure accumulator 29a, b as well as pressure sensors 30, 33 associated with the wheel brakes 13 to 16.

Document DE 10 2004 011 622 A1 described previously discloses the layout of the above-mentioned brake actuating unit 1. Therefore, a partial cross-sectional view of FIG. 2 depicts only the control group of the vacuum brake booster 2 in detail. The pedal travel simulator 6, which cooperates with the brake pedal 5 in particular in the 'brake-by-wire' operating mode imparting the usual brake pedal feeling to the driver, and which is outside the flux of forces between the brake pedal 5 and the brake booster 2 in the embodiment shown, cooperates with an electrohydraulic connecting and disconnecting device 60 that disconnects the pedal travel simulator 6 outside the 'brake-by-wire' operating mode. The connecting and disconnecting device 60 basically includes a piston-and-cylinder arrangement 51 and a hydraulic pressure fluid take-up element 56. By means of an actuating rod 58, the piston 52 of the piston-and-cylinder arrangement 51 is in a force-transmitting connection with a housing 61 of the pedal travel simulator 6 and delimits a pressure chamber 53, which is connected to the pressure fluid take-up element 56 by means of a hydraulic connection 54 shown in dotted lines, the said take-up element being designed as a low-pressure accumulator in the illustrated example. An electromagnetically operable shut-off valve 55 is inserted into the hydraulic connection 54 and allows shutting off the mentioned connection 54. The hydraulic pressure in the pressure chamber 53 of the piston-and-cylinder arrangement 51 can be determined by means of a pressure sensor 57. The measured pressure value must be almost zero in the initially opened shut-off valve 55, while an abrupt pressure rise must take place upon change-over of the shut-off valve 55 into its closing position. It is thus proven that the piston 52 has moved before the shut-off valve 55 is closed, that the shut-off valve 55 is sufficiently seal-tight and that the pressure sensor 57 is functioning.

In particular when performing a pre-drive or post-drive test, the use of a pressure sensor 57 is advantageous because the pressure sensor signal can be employed additionally as a plausibilisation of the signal that is produced by a pedal travel sensor associated with the brake pedal. The pressure sensor then makes it possible to detect certain fail conditions of the system, such as faulty detection of the brake pedal travel, thereby activating fallback modes.

As has been mentioned hereinabove, the representations according to FIGS. 3a and 3b show temporal variations of the brake pedal actuating travel s and the quantity $s_o$, which corresponds to the shortest actuating travel since the activation of the connecting and disconnecting device 60 and the actuation of the brake booster 2. Point A corresponds to the maximum actuating travel reached upon depression of the brake pedal 5, while the curve portion A to $A_0$ corresponds to a withdrawal of the actuating force which acts on the brake pedal 5 and results in a reduction of the actuating travel $S_A$ by a predetermined value $\Delta s$ to the value $s_0$. The actuation is performed in the initially mentioned 'conventional' mode in period 0 to $T_0$. At time $T_0$ the connecting and disconnecting device 60 of the pedal travel simulator 6 is activated and the brake booster 2 is driven by the electronic control unit 7 so that the actuating unit is subsequently operated in a mixed form of 'conventional' mode and the 'by-wire mode' in the interval $T_0$ to $T_2$. At time $T_1$ lying between the points $T_0$ and $T_2$, there is a new actuation or a continued depression of the brake pedal 5 by the operator, and a value $s_{01}$ is reached before the continued depression which is taken into consideration as the shortest actuating travel since the activation of the connecting and disconnecting device 60 and the actuation of the brake booster 2. At time $T_2$, the value $s_{02}$ corresponds to distance 'a' which serves for the decoupling of the force transmission between the brake pedal 5 and the brake booster 2. The above-mentioned mixed form is terminated, and the brake system has fully adopted the 'by-wire' mode. At time $T_3$, the brake pedal 5 is completely released and the actuation of the brake system is terminated.

FIG. 4 eventually shows the effect the measures explained above have on the characteristic curves, which represent the dependency of the nominal value $p_{nominal}$ of the hydraulic pressure introduced into the master brake cylinder 3 on the brake pedal actuating travel s. While the characteristic curve $p_{nominal}[T_2]$ represents the nominal characteristic curve, the characteristic curves $p_{nominal}[T_0]$ and $p_{nominal}[T_1]$ correspond to the previously explained performance of the system at times $T_0$ and $T_1$. In this context, it can be taken from FIG. 4 that the characteristic curve which corresponds to the 'first' lowest actuating travel value $s_0$ is shifted along the abscissa by a predetermined value $s_{shift}$. Characteristic curves are obtained by fixing further actuating travel values $s_0$ (see characteristic curve $p_{nominal}[T_1]$) which move in the direction of the nominal characteristic curve. The predetermined value $S_{shift}$ is calculated according to the equation $s_{shift}=s_0-k*s_{corr}$ in which $s_{corr}$ implies a correction value that depends on value $s_0$. FIG. 5 illustrates the dependency of the correction value $s_{corr}$ on value $s_0$. The factor k, which can adopt the values 0 or 1 in the simplest case, results from an assessment of the driving situation. A change-over from 0 to 1 is, for example, practicable when a rapid forward pedal movement above a threshold value is detected.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A brake-by-wire system of a motor vehicle comprising:
   a) a brake booster operable both by an electronic control unit and an input member that is movable into a force-transmitting connection with a brake pedal, with a distance being provided between the brake pedal and the brake booster that allows decoupling a force-transmitting connection between the brake pedal and the brake booster in a brake-by-wire operating mode,
   b) a master brake cylinder connected downstream of the brake booster,
   c) a pedal travel simulator that cooperates with the brake pedal to allow simulating a resetting force that acts on the brake pedal in the brake-by-wire operating mode independently of an actuation of the brake booster, and
   d) a connecting and disconnecting device configured to activate the pedal travel simulator in the brake-by-wire operating mode when the force-transmitting connection between the brake pedal and the brake booster is decoupled and deactivate the pedal travel simulator outside of the brake-by-wire operating mode,
   e) a sensor device configured to detect when an operator causes brake pedal travel and subsequent reduction thereof,
   wherein the control unit is configured to activate the connecting and disconnecting device and actuate the brake booster upon reduction of the actuating travel of the brake pedal by a predetermined value, the predetermined value being less than a full release of the brake pedal, or in an event of a detected vehicle movement or a positive result of a monitoring function of the connecting and disconnecting device.

2. The system as claimed in claim 1, wherein the connecting and disconnecting device includes:
   a hydraulic cylinder-and-piston arrangement;
   a pressure fluid volume take-up element;
   a pressure chamber delimited by a piston of the cylinder-and-piston arrangement on which a housing of the pedal travel simulator is supported;
   a passageway defined between the pressure fluid volume take-up element and the pressure chamber; and
   a shut-off valve for selectively closing the passageway, and in that the connecting and disconnecting device is activated by change-over of the shut-off valve into a closed position.

3. A method of operating a brake-by-wire system of a motor vehicle comprising:
   a) depressing a brake pedal to actuate a brake booster by a mechanical linkage;
   b) determining a travel distance of the brake pedal;
   c) withdrawing the brake pedal by a predetermined value, the predetermined value being less than a full release of the brake pedal;
   d) upon reaching the predetermined value, de-actuating the mechanical linkage;
   e) actuating the brake booster by an electronic control unit in a brake-by-wire operating mode; and
   f) activating a pedal travel simulator in the brake-by-wire operating mode to simulate a resetting force that acts on the brake pedal independently of an actuation of the brake booster.

4. The method as claimed in claim 3, wherein a nominal value ($P_{nominal}$) of a hydraulic pressure that is introduced into the master brake cylinder by actuation of the brake booster is taken from a characteristic curve ($P_{nominal}=f(s)$), which associates a pressure value (p) with an actuating travel (s) of the brake pedal and which, compared to a nominal characteristic curve ($p=f(s)$), is shifted by a value ($S_{shift}$) and/or is appropriately scaled according to the value ($S_{shift}$) which corresponds to a shortest actuating travel ($s_0$) since the activation of the connecting and disconnecting device and the actuation of the brake booster minus a correction value ($s_{corr}$).

5. The method as claimed in claim 4, wherein the characteristic curve ($P_{nominal}=f(s)$) represents the relationship between the actuating travel (s) of the brake pedal and the nominal value ($P_{nominal}$) of the pressure introduced into the master brake cylinder.

6. The method as claimed in claim 4, wherein the correction value ($s_{corr}$) depends on the shortest actuating travel ($s_0$) since the activation of the connecting and disconnecting device and the actuation of the brake booster.

7. The method as claimed in claim 6, wherein a change-over between several characteristic curves ($s_{corr}$) can be made depending on a driving situation.

8. The method as claimed in claim 6, wherein the correction value ($s_{corr}$) is stored in the form of a characteristic curve in the electronic control unit.

* * * * *

UNITED STATES PATENT AND TRADEMARK OFFICE
CERTIFICATE OF CORRECTION

PATENT NO. : 8,695,478 B2  Page 1 of 1
APPLICATION NO. : 12/279014
DATED : April 15, 2014
INVENTOR(S) : Feick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1402 days.

Signed and Sealed this

Twenty-ninth Day of September, 2015

Michelle K. Lee
*Director of the United States Patent and Trademark Office*